Jan. 23, 1962     E. C. B. CORLETT     3,017,956
CARGO HOISTS

Filed Oct. 19, 1959     4 Sheets-Sheet 1

Jan. 23, 1962   E. C. B. CORLETT   3,017,956
CARGO HOISTS

Filed Oct. 19, 1959   4 Sheets-Sheet 3

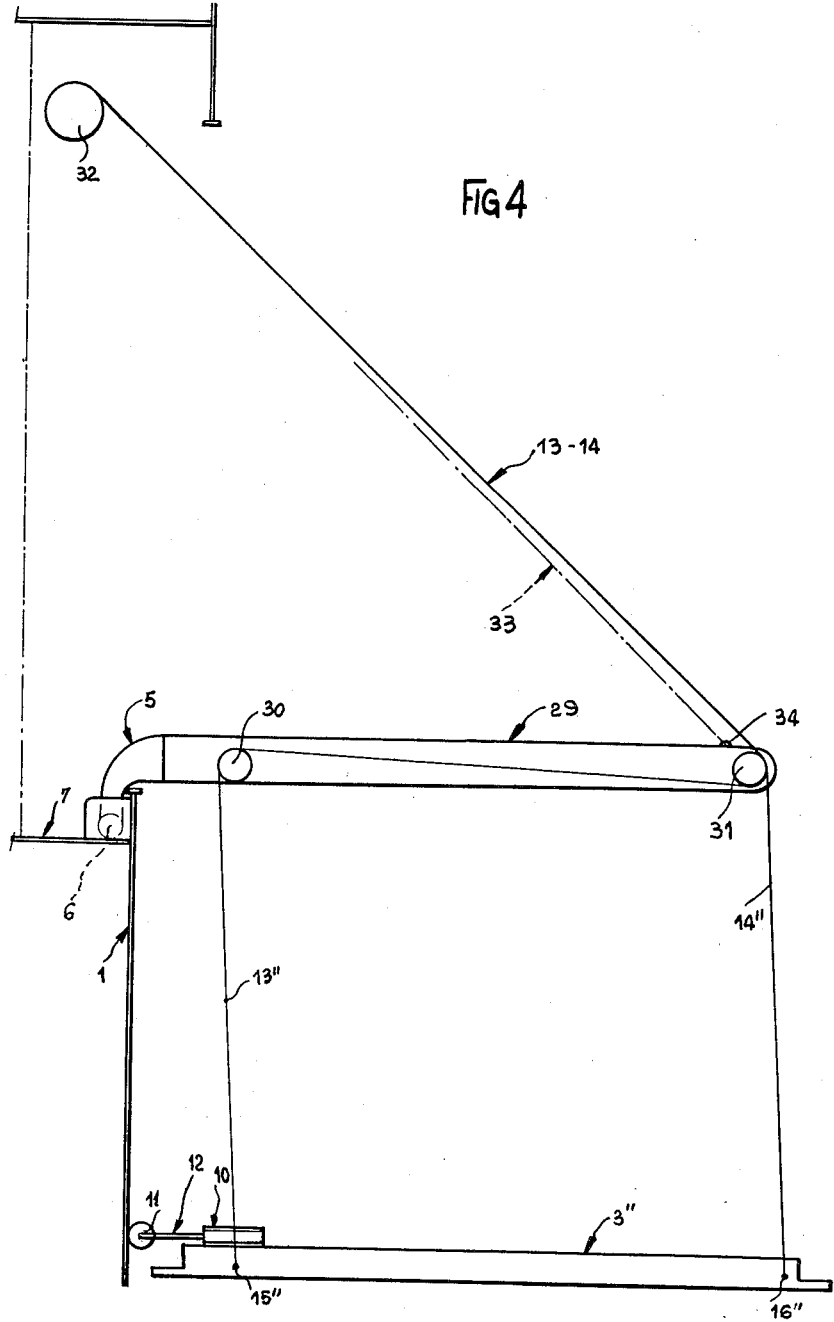

United States Patent Office 3,017,956
Patented Jan. 23, 1962

3,017,956
CARGO HOISTS
Ewan Christian Brew Corlett, Coach House,
Worting Park, Basingstoke, England
Filed Oct. 19, 1959, Ser. No. 847,265
Claims priority, application Great Britain Oct. 29, 1958
6 Claims. (Cl. 187—6)

This invention is concerned with improved means for effecting the lateral loading and unloading of ships, silos, etc.

Installations are already known which comprise a lateral door hingedly mounted about an inner horizontal axis and adapted to occupy a horizontal position externally of the ship or like structure on which it is mounted. This door may be provided with pulley blocks whereby the loads may be hoisted from the the quay or ground level to the door level. The door itself will only pivot from its vertical posittion to its horizontal position, and vice-versa.

Tipping platforms are also known which are mounted on the ship's deck and pivoted about a horizontal axis adapted in turn to move along the ship's hull, adequate slideways or like guide means being provided to this end so as to guide the platform to a lower position, for example at quay level. Upon completion of the unloading and/or loading operations the platform is hoisted to the ship's deck level, the same guide means being operative in this case.

All these known installations have a common drawback, in that they either require the provision of more or less fragile riggings and fittings, such as the guide means disposed alongside the ship's hull, or have a poor versatility so that the loading and unloading operations are usually effected at an irregular and relatively slow rate.

It is the essential object of this invention to avoid these various drawbacks by providing an installation suitable for use on board ships, in silos, etc., which is of the type comprising a side door adapted to be pivoted about a horizontal axis located at or near its lower edge so as to form in the horizontal position a loading and unloading platform. This installation is remarkable notably in that the aforesaid door is detachably connected to its pivot means, and that actuating means are provided on board the ship or in the silo whereby the door can be unfolded or opened to occupy a substantially horizontal position, and subsequently displaced vertically up—or downwards along the ship's hull or the wall of the silo, somewhat in the fashion of a loading and unloading platform or pallet.

According to another feature of this invention, the aforesaid door is hingedly mounted by means of girders, arms or the like having one end pivotally mounted on a pivot pin rigid with the ship or silo, and the other end connected to the door by means of one or more readily detachable pins, bolts, or the like.

According to a further feature characterizing this invention, in the horizontal position the aforesaid door is secured to and suspended from cables or chains through which the vertical displacements of the platform are controlled for effecting the loading and unloading operations.

According to another feature of this invention, one or more stop and guide means is or are provided on the lateral door with a view to prevent it from running against the walls of the ship or silo during the vertical loading and unloading movements.

From the foregoing, the considerable advantages deriving from the installation according to this invention will be readily understood. Firstly, the new elements introduced into the construction of the ship or silo are very sturdy. The door may be cut either in the ship's hull or in the wall of the silo, and used as a perfectly separate platform. Moreover, this platform does not require any special means thereon for maneuvering it, since it is merely sufficient to anchor it to adequate cables and hoist or lower the platform exactly as in the case of any conventional pallet. On the other hand, it is worth pointing out that this door, in its inoperative position, will merge in the hull or wall and therefore not occupy the slightest space and interfere with the inner space available in the ship or silo.

According to a specific form of embodiment of this invention, the pulley blocks for guiding the suspension and handling cable or cables are mounted on one or more substantially horizontal beams overlying the door when the latter is in its horizontal position, these beams being adapted to be fully retracted inside the ship or silo when they are not needed; other features and advantages of this invention will become apparent as the following description proceeds with reference to the attached drawings forming part of this specification and illustrating diagrammatically by way of example a few typical forms of embodiment of the invention. In the drawings:

FIG. 1a is a cross-sectional view of a shock absorbing device;

FIGURES 3 and 4 illustrate another modified form of embodiment shown in two different positions.

Figure 1:
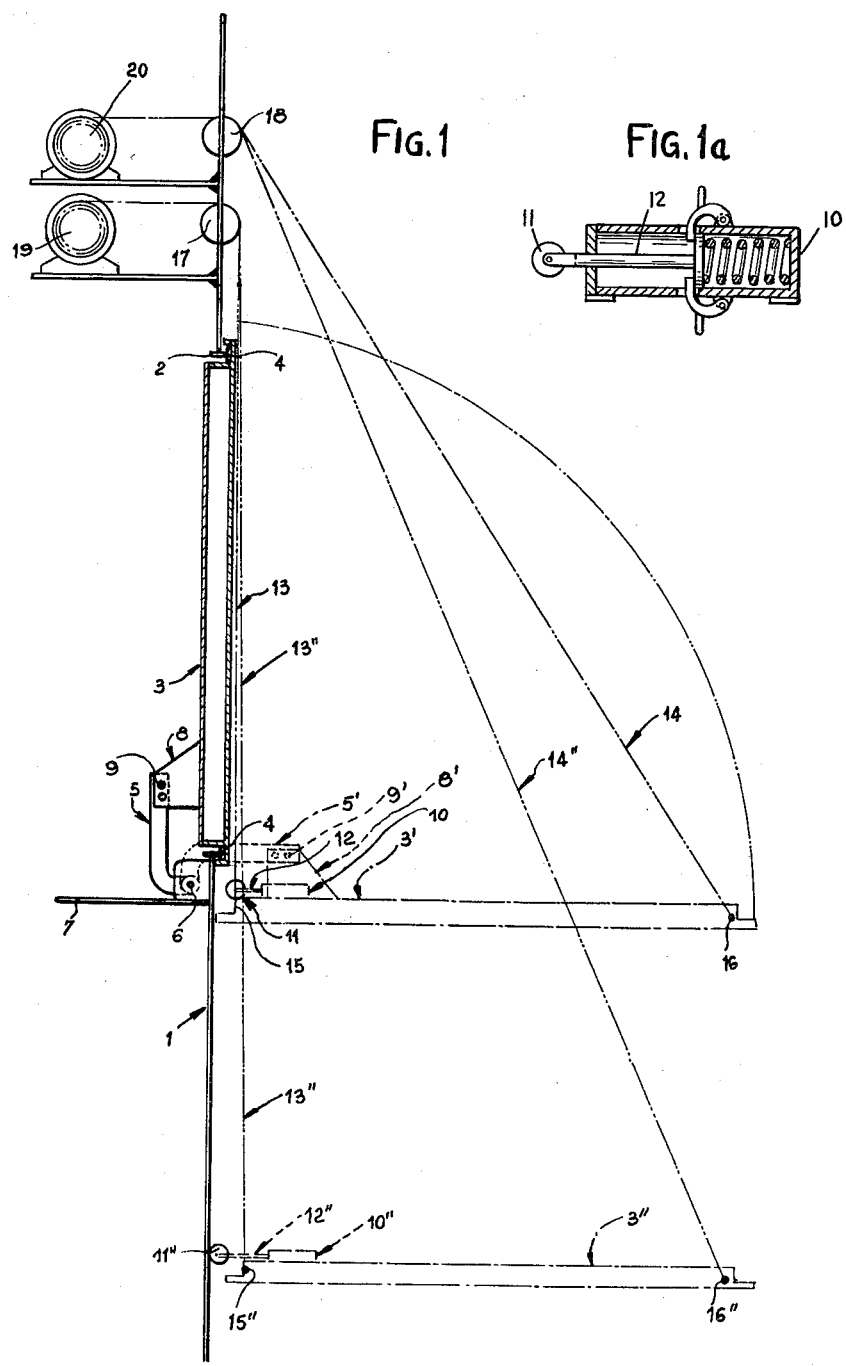
FIGURE 1 is a diagrammatic view showing an installation constructed according to the teachings of this invention on board a ship.

In the form of embodiment shown in FIGURE 1, the reference numeral 1 designates the hull of a ship in which an aperture 2 closed by a door 3 has been formed, adequate sealing means 4 being interposed, of course, between the machine edges of the aperture and door to prevent the ingress of water, or provide a weather protection. An arm or girder 5 pivotally mounted at 6 inside the ship in the vicinity, for example and preferably, of a 'tweendeck 7, may be rigidly assembled with the door 3 by means of a perforated bracket or lug 8 provided thereon and engageable by adequate pins or bolts 9. Of course, if the width of the door 3 is considerable, a plurality of arms 5 may be disposed at spaced intervals along this width.

Preferably, the bolts or pins 9, or any other suitable fastening members provided between the arm 5 and member 8, should be of a type adapted to be easily removed and handled. The function of the arms 5 is to permit the pivotal movement of the door 3 from its vertical or closed position to a substantially horizontal position shown in chain-dotted lines at 3'. This pivotal movement takes place about the axis of pin 6.

On the door 3 and preferably in the vicinity of the arms 5 shock-absorbing and guide means 10 are provided, for example in the form of rollers 11 mounted by means of horizontal pins on rods 12 and responsive, for example, to the resilient force of a spring or like member. These rollers 11 are adapted to occupy a retracted position as shown in position 3' of the hinged door, or 11" in position 3" of this door, wherein the spring or like shock-absorbing element (not shown) resiliently urges the roller against the hull of the ship 1. Locking means of adequate character may be provided to retain the roller 11 in its retracted position.

In the example illustrated in FIGURE 1, two cables or more exactly two pairs of cables are provided, these cables 13 and 14 are secured to the platform at 15 and 16, as shown. They are guided by pulley blocks or sheaves 17, 18 and adapted to be wound on drums 19, 20. If desired, these winding drums may be mounted on a common shaft, as shown in FIGURE 1, and driven from a single motor. The contour of these drums is so designed that the winding and unwinding movements of the cables 13, 14 take place regularly and that the anchor points 15, 16 thereof remain constantly in a substantially horizontal plane.

The operation of the installation so far described is very simple. At the beginning, when the door 3 closes the lateral aperture 2 formed in the hull or wall 1, the sealing gaskets or like means 4 are pressed against the edges of the aperture. When it is desired to load or unload the 'tweendeck 7, the sealing gaskets are firstly relieved of the sealing pressure, according to the well-known practice, whereafter the door 3 is opened by pivoting same about the axis 6 to the substantially horizontal position 3'. Before accomplishing this opening movement the lower ends of the cables 13, 14 are attached at points 15, 16 of the door. The drum pair 19, 20 is subjected to a braking force in order to support the platform 3'. Then the pins or bolts 9 are removed, thus releasing the platform from its hinge axis 6. At the same time, the springs or like resilient means contained in the shock-absorbing devices 10 are released, thereby allowing the roller 11 to engage the outer surface of the hull or wall 1. By gradually slackening the cables 13 and 14, the platform is then allowed to move from position 3' to position 3" and during this movement the platform is guided by the engagement of rollers 11 with the hull or wall 1, thereby preventing the latter from being damaged by the platform.

The reverse movement takes place under the same conditions, and when the platform has resumed its upper horizontal position 3' the member 8 registers with the arm 5 and under these conditions it is sufficient to re-insert the pins or bolts 9 therethrough for rendering again the platform rigid with the arms 5 and permitting its pivotal movement from the horizontal position to the vertical position shown at 3.

Figure 2:
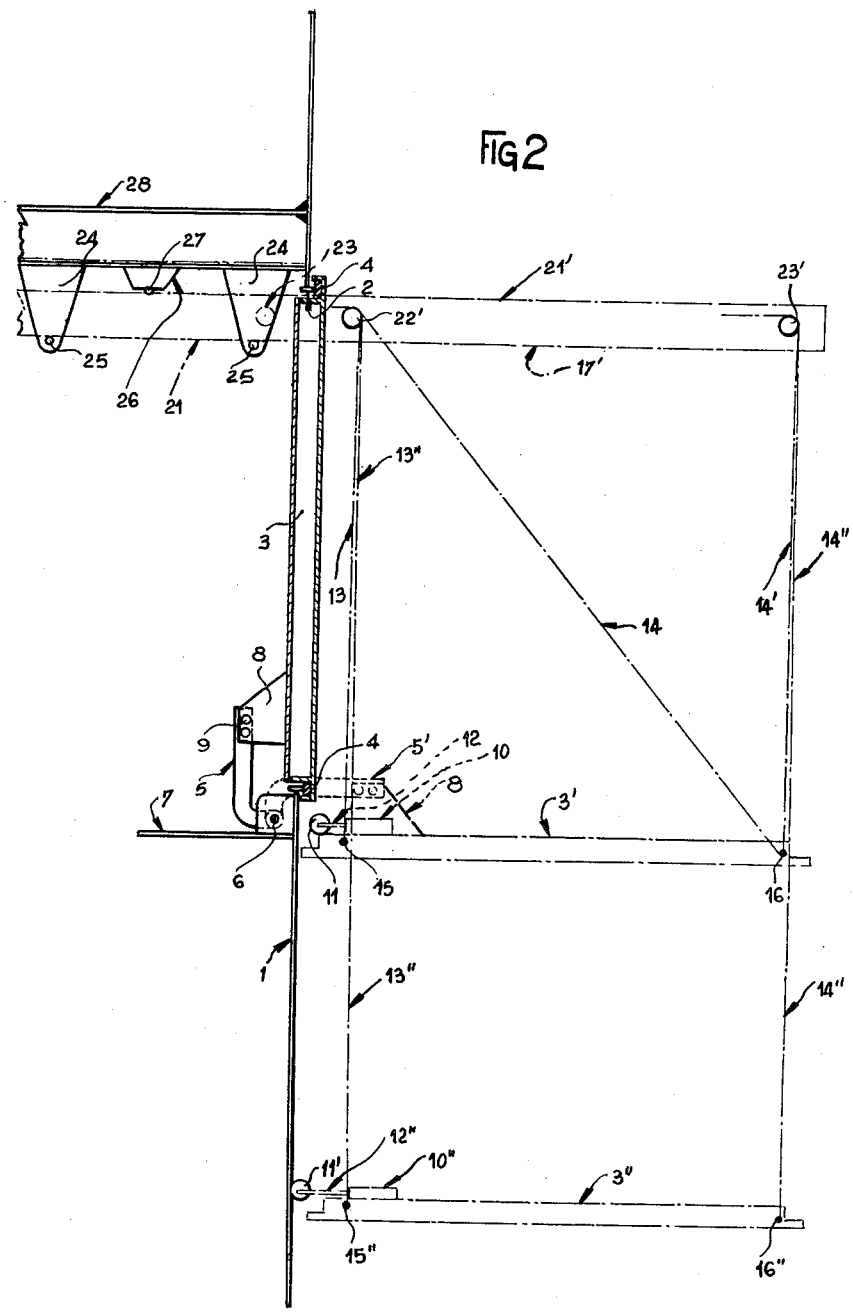
FIGURE 2 is a similar view of a modified form of embodiment.

The operation of the form of embodiment shown in FIGURE 2 is identical with the one shown in FIGURE 1 and described hereinabove. The only difference between these two forms of embodiment lies in the arrangement of the means for actuating the platform. In the case shown in FIGURE 1, the platform is operated by means of cables 13, 14 guided by pulley blocks 17, 18 mounted on the ship, whereas in the case shown in FIGURE 2 a beam 21 carrying a pair of pulleys 22, 23 for guiding the opening cables 13, 14 is provided. This beam is adapted to move horizontally along its axis in yokes 24 provided with carrier rollers 25. At the top, the guiding action may be completed by the provision of a top roller 27 supported by a bracket 26. The yoke assembly may be carried by a fixed girder 28 provided in the ship or silo.

This installation operates somewhat like the one shown in FIGURE 1. However, in this case, initially, that is, when the door 3 is still closed, the beam 21 is retracted within the ship or silo. The cable 14, by passing over the pulley 22, permits of pivoting the door 3 to bring same to the upper horizontal position shown in chain-dotted lines at 3'. Subsequent to this step, the beam is moved to position 21' shown in FIGURE 2. At this moment the pulley 23 will move to position 23' and by so doing it will carry along the cable 14 to position 14'. Thus, the two pulleys occupy the respective positions 22' and 23' and overlie the anchoring points 15, 16 of cables 13, 14 on the platform, respectively. The other steps of the platform operation are exactly like those already described with reference to FIGURE 1.

Figure 3:
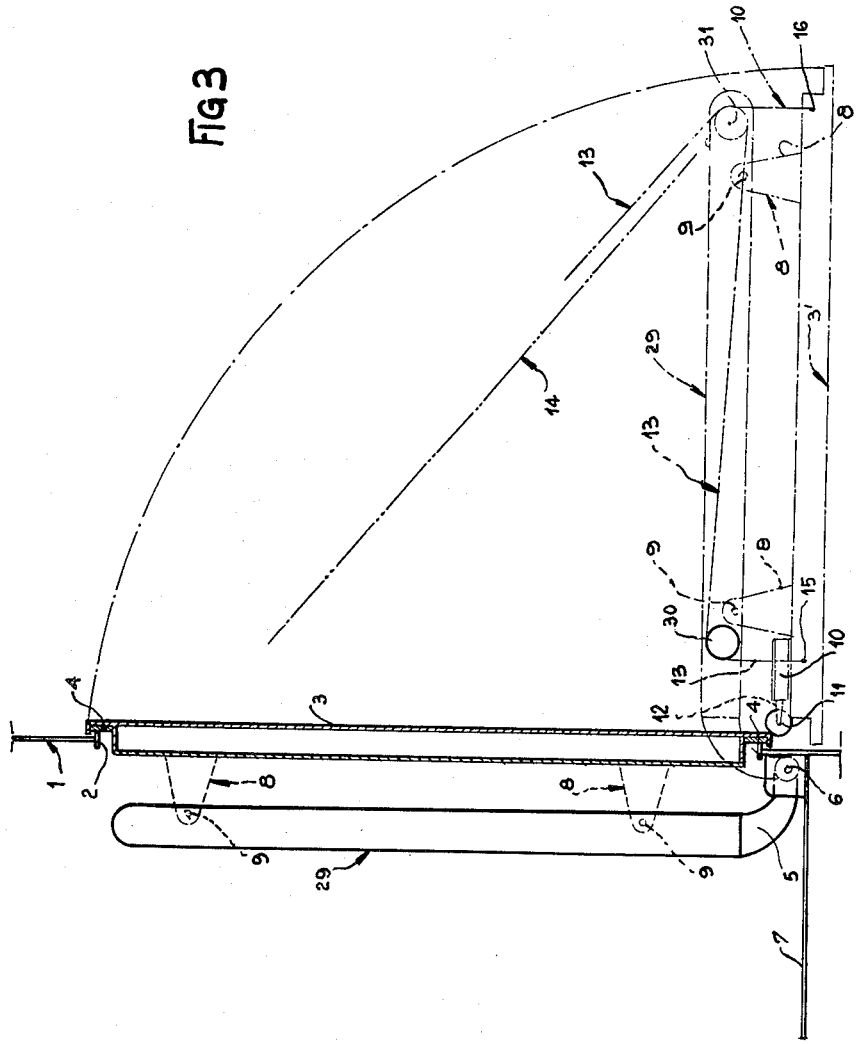

Referring now to the modified form of embodiment shown in FIGURES 3 and 4 of the drawings, each arm or girder 5 is formed with an extension 29. As in the preceding cases, this girder is secured on the door 3 by means of brackets, lugs or like projections 8 and quickly detachable pins or bolts 9'. On the extension 29 of the arm or girder 5, rollers or pulleys 30, 31 are provided to guide the pair of actuating cables 13, 14 having their outer ends anchored to the platform at 15, 16. Cable 13 passes over both pulleys 30, 31 whereas cable 14 is guided only by the pulley 31. These two cables may be wound on a common drum 32.

A special cable 33 may be secured to the arm 29 at 34 for pivoting and maintaining same in the horizontal position.

The operation of this installation is also very simple. Firstly, the complete assembly comprising the door 3 and its arms 5, 29 is pivoted to its substantially horizontal position as shown in chain-dotted lines at 3' in FIGURE 3. This position is shown in thick lines in FIGURE 4. Then the platform is released from its carrier arms 5, 29, by removing the pins or bolts 9, whereafter the platform can be lowered as shown at 3" in FIGURE 4.

Of course, the invention should not be construed as being limited to the specific form of embodiment shown and described herein by way of example as many modifications may be brought thereto without departing from the spirit and scope of the invention as set forth in the appended claims.

What I claim is:

1. A hoisting device for loading and unloading a space comprised in a ship, a silo and the like mounted on at least one opening formed in a side wall thereof, comprising a panel for opening and closing said opening, substantially horizontally extending hinge means on the lower edge portion of said opening for pivotally mounting said panel therein and allowing it to be swung in a substantially horizontal position, a detachable connection between said panel and said hinge means, flexible means for supporting said panel when it has been swung into its substantially horizontal position and for controlling its up and down motion along said side wall upon the release of said detachable connection, winding control means for said flexible means and guiding roller means for same located over said opening.

2. A device according to claim 1 comprising at least one resilient shock absorbing roller means slidably mounted on and urged to protrude laterally from said panel for preventing said latter from running against said side wall during the up and down movement of said panel.

3. A device according to claim 2 wherein said shock absorbing means is of a fully retractable type.

4. A device according to claim 3 wherein said shock absorbing roller means comprises locking means for maintaining said roller in its retracted position.

5. A device according to claim 1 wherein said detachable connection comprises at least one arm like member one end of which is pivoted on said hinge means, at least one protruding element on said panel and finger like members for detachably connecting said arm like member and protruding element.

6. A hoisting device for loading and unloading a space comprised in a ship, a silo and the like, mounted on at least one opening, formed in a side wall thereof, comprising a panel for opening and closing said opening, substantially horizontally extending hinge means on the lower edge portion of said opening for pivotally mounting said panel therein and allowing it to be swung in a substantially horizontal position, a detachable connection between said panel and said hingle means, said detachable connection comprising a beam like element for being detachably connected to said panel, and pivot means for pivotally mounting said beam on said hinge, flexible means for supporting said panel when it has been swung into its substantially horizontal position and for controlling its up and down motion along said wall upon upon the release of said detachable connection, and guiding roller means for said flexible means provided on said beam.

References Cited in the file of this patent

UNITED STATES PATENTS

| | | |
|---|---|---|
| 461,606 | Geyer | Oct. 20, 1891 |
| 1,829,739 | Davidson | Nov. 3, 1931 |
| 2,236,019 | Thompson | Mar. 25, 1941 |
| 2,541,893 | Speer | Feb. 13, 1951 |
| 2,798,574 | Wardell | July 9, 1957 |
| 2,836,308 | Lamb | May 27, 1958 |

FOREIGN PATENTS

| | | |
|---|---|---|
| 158,101 | Australia | Aug. 6, 1954 |